United States Patent
Lushear et al.

(10) Patent No.: US 12,436,836 B2
(45) Date of Patent: Oct. 7, 2025

(54) AUTOMATED FIX ACTION ANALYSIS AND INCIDENT IMPACT AWARENESS

(71) Applicant: T-Mobile Innovations LLC, Overland Park, KS (US)

(72) Inventors: Brian D. Lushear, Winter Springs, FL (US); Christopher C. Poirier, Titusville, FL (US)

(73) Assignee: T-Mobile Innovations LLC, Overland Park, KS (US)

(*) Notice: Subject to any disclaimer, the term of this patent is extended or adjusted under 35 U.S.C. 154(b) by 91 days.

(21) Appl. No.: 18/322,536

(22) Filed: May 23, 2023

(65) Prior Publication Data

US 2024/0394139 A1    Nov. 28, 2024

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01)

(58) Field of Classification Search
CPC ........................... G06F 11/079; G06F 11/0793
See application file for complete search history.

(56) References Cited

U.S. PATENT DOCUMENTS

| | | | |
|---|---|---|---|
| 11,140,553 B1* | 10/2021 | Taylor | H04W 12/122 |
| 11,595,243 B1 | 2/2023 | Schreiber et al. | |
| 11,818,087 B1* | 11/2023 | Palki | H04L 51/18 |
| 11,977,523 B1* | 5/2024 | Li | G06F 16/211 |
| 12,001,276 B2* | 6/2024 | Lairsey | G06F 9/4881 |
| 2010/0312522 A1 | 12/2010 | Laberge et al. | |
| 2017/0214744 A1* | 7/2017 | Neves | H04L 67/34 |
| 2021/0089370 A1* | 3/2021 | Dukhovny | G06F 11/301 |
| 2022/0121628 A1* | 4/2022 | Devaraj | G06F 11/323 |
| 2022/0277075 A1* | 9/2022 | Cummings | H04L 63/1441 |

(Continued)

FOREIGN PATENT DOCUMENTS

EP    4468667 A1    11/2024

OTHER PUBLICATIONS

Foreign communication from related application—European Extended Search Report and Search Opinion dated Oct. 18, 2024 regarding EP Application No. 24173688.3, filed May 1, 2024 28 pages.

(Continued)

*Primary Examiner* — Joshua P Lottich (57) ABSTRACT

A method of initiating actions based on analyzing automated fix actions in a telecommunication network management system, the method comprising obtaining, by an incident management application executing on a computer system, prior incident reports associated with a plurality of historical incidents from a database, wherein the prior incident reports comprise one or more recommended corrective actions taken or to be taken to resolve the historical incidents; evaluating, by the incident management application, the prior incident reports to determine a severity level of the prior incident reports and/or an effectiveness value of the one or more recommended corrective actions; prioritizing actions to be taken automatically or by NOC personnel based on the severity level and/or the effectiveness value; and initiating a corrective action to be taken automatically or by the NOC personnel to resolve an active incident report based on the prioritization.

20 Claims, 4 Drawing Sheets

(56) References Cited

U.S. PATENT DOCUMENTS

2022/0383229 A1\* 12/2022 Shrestha ............. G06F 11/0751
2023/0130927 A1\* 4/2023 Thakkar ............. G06F 11/0787
                                                          714/37
2024/0248787 A1\* 7/2024 Neogi ................. G06F 11/0784

OTHER PUBLICATIONS

Chen, Zhuangbin, et al., "Towards Intelligent Incident Management: Why We Need It and How We Make It", ACM Joint European Software Engineering Conference and Symposium on the Foundations of Software Engineering, Nov. 8-13, 2020, 11 pages.

\* cited by examiner

AUTOMATED FIX ACTION ANALYSIS AND INCIDENT IMPACT AWARENESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The difficulty of managing a communications network increases as its complexity increases. As networks grow in complexity, so too does the difficulty of managing it. Managing a network includes one or more of retrieving historical performance, observing that the network is currently functioning properly, fixing underperforming equipment, and ensuring that the network will function properly in the future. To accomplish each of these functions, feedback from the network is necessary. The most widely relied upon feedback are alarms that generate incident reports associated with the events/incidents. However, network operations center (NOC) personnel assigned to troubleshoot the incident reports may be unfamiliar with the network equipment element and/or the nature of the issue that has occurred. The time spent on the resolving an incident report may lead to more money and resources being spent by a company to fix the problem. Thus, it is desirable to provide incident analysis of past incidents to assist the contributors in better understanding network failures.

SUMMARY

In an embodiment, a method of measuring an impact of an incident in a telecommunication network management system is disclosed. The method comprises importing, by an incident management application executing on a computer system, an incident report associated with the incident from a data store into a graphical user interface (GUI) screen after the incident report is automatically closed; identifying, by the incident management application, one or more alarms associated with the incident report; analyzing, by the incident management application, the one or more alarms and/or the incident report based on site status data and performance data to retrieve incident data; analyzing, by the incident management application, corrective actions taken to resolve the incident; providing, by the incident management application, recommended corrective actions to NOC personnel based on the incident data and the corrective actions; recording and saving, by the incident management application, the recommended corrective actions in the data store along with the incident report.

In another embodiment, a method of initiating actions based on analysis of automated fix actions in a telecommunication network management system is disclosed. The method comprises obtaining, by an incident management application executing on a computer system, prior incident reports associated with a plurality of historical incidents from a database, wherein the prior incident reports comprise one or more recommended corrective actions taken or to be taken to resolve the historical incidents; evaluating, by the incident management application, the incident report to determine a severity level of the incident report, and an effectiveness value of the one or more recommended corrective actions; prioritizing actions to be taken automatically or by NOC personnel based on the severity level and/or the effectiveness value; and initiating a corrective action to be taken automatically or by the NOC personnel to resolve an active incident report based on the prioritization.

In yet another embodiment, a method of initiating actions based on analysis of an impact of an incident in a telecommunication network management system is disclosed. The method comprises importing, by an incident management application executing on a computer system, an incident report associated with the incident from a data store into a graphical user interface (GUI) screen after the incident report is automatically closed; identifying, by the incident management application, one or more alarms associated with the incident report; analyzing, by the incident management application, the one or more alarms and/or the incident report based on site status data and performance data to retrieve incident data; analyzing, by the incident management application, corrective actions taken to resolve the incident; providing, by the incident management application, one or more recommended corrective actions to NOC personnel based on the incident data and the corrective actions; recording and saving, by the incident management application, the recommended corrective actions in the data store along with the incident report; evaluating, by the incident management application, the incident report to determine a severity level of the incident report, and an effectiveness value of the one or more recommended corrective actions; and prioritizing actions to be taken automatically or by NOC personnel based on the severity level and/or the effectiveness value; and initiating a corrective action to be taken automatically or by the NOC personnel to resolve an active incident report based on the prioritization.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network monitoring involves receiving and understanding alarms that are assigned to various network elements in a telecom network. These alarms are activated when irregularities or fault events are detected in their respective elements. An incident reporting system may collect the alarms and generate incident reports (a.k.a tickets or trouble tickets) associated with the events/incidents. Fault events in the network are reported to NOC personnel in the form of these incident reports. The incident report provides a valuable reference for NOC personnel to identify the potential root causes of network faults and ensure the normal operation of network services. However, in an attempt to find the root cause of such incidents, several labor hours may be consumed analyzing the incident report. This process is often cost-inefficient, tardy, and involves a significant number of people. Furthermore, due to this process, lessons learned from past incident resolution cases remain unrecorded expert data of the NOC personnel without much systematic analysis, if any, for possible future use. Therefore, it is desirable to manage the network intelligently and automatically for any network operator and data center. When aiming at an automation of the process, machine-based analysis techniques that are able to learn knowledge from previous incidents are desirable.

The present disclosure teaches methods and systems for measuring an impact of an incident after an incident report associated with the incident is closed and for evaluating automated fix actions for assisting NOC personnel in better understanding network failures and expedite the processing of alarms in NOCs. In one embodiment, an incident management application is responsible for presenting these incident reports/alarms to, for instance, NOC personnel for analyzing an alarm and/or an incident report after the incident report is closed. During this analysis, NOC personnel collect incident data comprising performance data (such as key performance indicators (KPIs) information) and cell site status data associated with the incident from operational support system (OSS) of the telecom network to understand and measure the impact of the incident.

In general, NOC alarm processing involves performing automatic actions on the generated incident reports including auto-triage, auto-closure, and/or auto-remediation. Due to diversity of alarm information caused by the multiple technologies and multiple vendor solutions makes it difficult to create a coordinated view of the telecom network and significantly increases the complexity associated with alarm detection and resolution. For example, in some instances, the initial recommended severity levels of alarms defined by vendors may be false. In this case, some alarms deemed to be service affecting or service impacting when in fact such alarms are not service affecting or service impacting because these alarms are configured by vendors of cell site equipment. For example, an alarm database upload failure alarm is defined default as service impacting which is not in fact service impacting. In another example, a service affecting alarm is generated when a redundant pathway becomes down when in fact such alarm is not service affecting, because the primary path successfully carried bearer traffic with no impact to customers. In some other instances, an alarm configured by different vendors may be of low severity in one context but of high severity in another context. In some other instances, different vendors of cell site equipment may arbitrary classify the alarms generated by their equipment and can be wrong. In some other instances, some alarms seem to be fixed and then recur shortly after the incident report is closed. In some other instances, different customers experience different impact by a same incident. For example, home internet customers experience different impact than mobile customers from a same alarm/incident.

In some other instance, there may be uncalibrated time delays in autogenerating an alarm and an incident report. For example, in general, the incident management application delays creating the alarm and the incident report when the alarm is received. For example, the incident management application may delay for 5 minutes (mins) in generating the alarm and delay for 25 mins in generating the incident report. However, when the alarm is service affecting or service impacting (e.g., a large-scale event), these delays that are defined initially don't match well to the actual time, and then the delays may change. Then, the alarms configuration tool may instruct to reduce the 5-mins delay to a 2-mins delay in generating the alarm and the 25-mins delay to a 15-mins delay in generating the incident report to fix the service affecting alarm or service impacting alarm. In another case, when the alarm is not service affecting or service impacting, then, the alarms configuration tool may instruct to increase the 5-mins delay to a 10-mins delay in generating the alarm and the 25-mins delay to a 40-mins delay in generating the incident report to fix the issue.

These instances are undesirable, because these involve inefficiencies and may further result in uncoordinated, disparate repairs to the incident reports/alarms. The present disclosure teaches analyzing actual prospect of service impacting or service affecting alarms, identifying a severity level of the alarm, fine tuning time delays for autogenerating alarms and incident reports, and reducing false alarms based on KPIs, cell site status data, performance data, or other indications. The analysis of incident data may improve troubleshooting efficiency as resources will be focused on more quickly repairing network elements that are actually experiencing down time, increase network reliability, and increase customer satisfaction with the network.

In one embodiment, the incident data comprises information about what alarms were associated to the incident and when they occurred. In one embodiment, the incident data further comprises information about a severity level of the alarms, which devices and applications were impacted by the incident, what services and technologies were impacted by the incident, what changes to the devices, applications, services, technologies, and/or in KPIs have caused by the incident. In an embodiment, the incident data further comprises information about how many customers were impacted by the incident, type of customers impacted by the incident, how long the customers were impacted, which customers were impacted after or before the incident, and/or any other information related to the incident. In one embodiment, the incident data further comprises information about what corrective actions were taken by automation or manually by an operator to resolve the incident. In one embodiment, the incident management application provides the incident data to NOC personnel for analyzing to better understand and measure the impact of the incident. In one embodiment, the incident management application record and save the incident data and the recommended corrective actions in the data store along with the incident report.

In one embodiment, NOC personnel identify a set of historical incident reports, the incident data, and recommended corrective actions to inform future decisions on what steps automation or the operator should take in the future to resolve the issue quickly. In one embodiment, the incident management application may evaluate a set of historical incident reports, the incident data, and the recommended corrective actions to prioritize actions for the alarms. This prioritization can be determined based on various factors such as how severe is the incident report or alarm, and/or how effective the recommended corrective action is in resolving a particular issue. In one embodiment, the incident management application prioritizes actions for the alarms to be taken automatically or by NOC personnel based on severity of the alarm/incident report and/or an effectiveness of the recommended corrective actions. The incident management application may initiate a corrective action to be taken automatically or by the NOC personnel to resolve an active incident report based on the prioritization. In one embodiment, the incident management application may provide recommended optimization actions for future incidents and also monitor for decision making on the incidents after that.

In one embodiment, based on the severity, the effectiveness, and/or the incident data, a development team can design, implement, test, and deploy the automated fixes to resolve an issue in a shortest time possible and further can train a machine learning model to classify, filter out, and order the most important alarms, in real time, and present those selected alarms to the operators that can help the operators to become more active in addressing network incidents. In one embodiment, the machine learning model or automation can further leverage corrective actions taken in the recent past (e.g., during a first occurrence of the incident) for a particular site to take different corrective actions on a current incident for that particular site. Thus, the use of the machine learning model may enable review of current incident data and historical incident data for effective incident resolution and for better informed future decisions. The machine learning model may review automation responses completed recently on the particular site and recommend one or more corrective actions to resolve similar incidents in an efficient manner.

The present disclosure teaches proactive analysis of incident data for simplifying the process of network maintenance by predicting root cause for alarms and prioritizing network fixes with a foresight perspective, thereby reducing the burden of handling subsequent alarms and/or incident reports. Further, the use of a machine learning model, during the analysis by extracting knowledge from previous incident reports, current incident reports, and remedial actions, may enable the automatic diagnosis and resolution of network issues in an effective manner.

Figure 1:
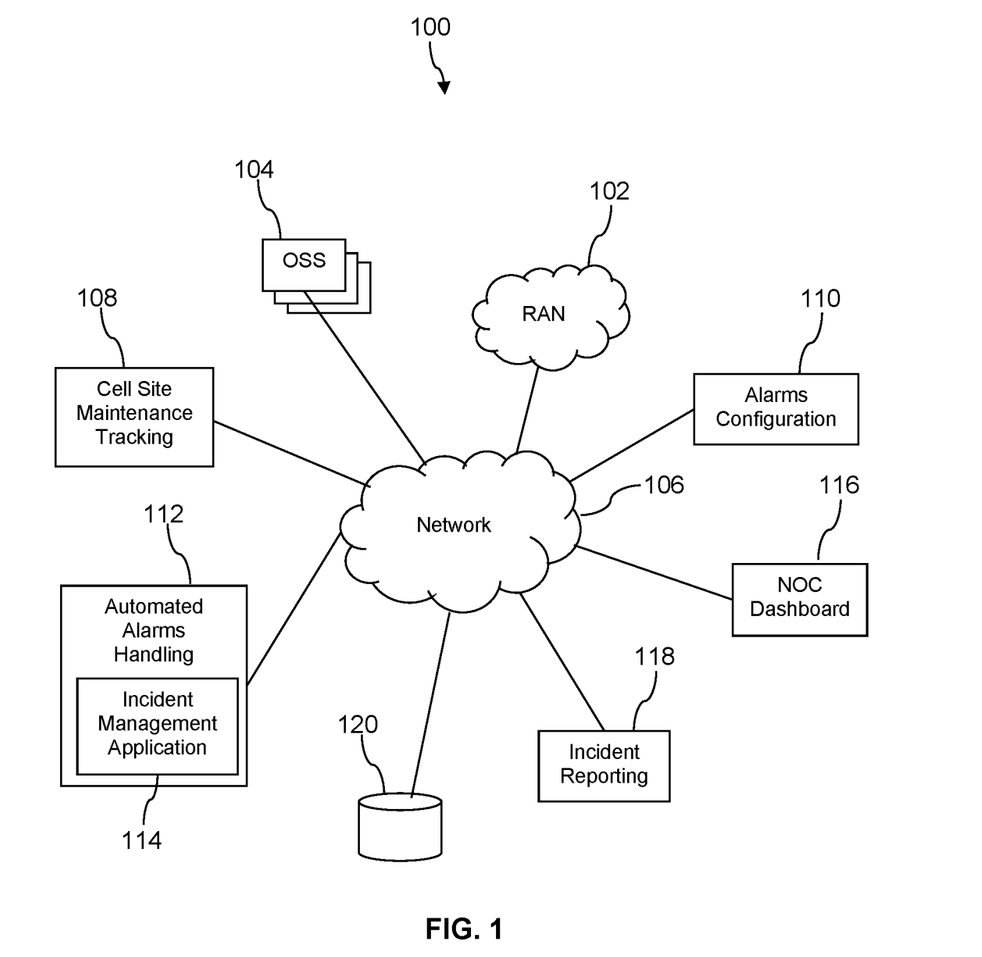
FIG. 1 is an illustration of a communication management system according to an embodiment of the disclosure.

Turning now to FIG. 1, a communication system 100 is described. In an embodiment, the communication system 100 comprises a radio access network (RAN) 102, a plurality of operational support system (OSS) 104, a network 106, a cell site maintenance tracking tool 108, an alarms configuration tool 110, an automated alarm handling tool 112 that executes an incident management application 114, a NOC dashboard tool 116, an incident reporting tool 118, and a data store 120.

The RAN 102 includes a plurality of cell sites and network elements (NEs) associated with the RAN. The alarms may have been generated by various NEs of a service provider network. The NE, for example, may be any of a router, a digital switch, a media gateway, a mobile switching center (MSC), a visitor location register (VLR), a mobile management entity (MME), a serving gateway (SGW), a packet data network gateway (PDN-GW), a radius server, an authentication-authorization-and-accounting (AAA) server, a base transceiver station (BTS) or an enhanced Node B (eNB), a short message service (SMS) messaging component, a core network component, a wireless radio access network component, a voicemail component, or some other type of network element. The eNB may alternatively be referred to in some contexts as a base transceiver station or a cell tower. The service provider network is a portion of the network 106. The network 106 comprises one or more public networks, one or more private networks, or a combination thereof.

The RAN 102 provides access and coordinates the management of resources across the cell sites. Vendors of NEs and cell site equipment provide the OSS 104 for monitoring and remotely managing the NEs and cell site equipment. The OSS 104 support management functions such as network inventory, service provisioning, network configuration, and fault management. When the NEs or cell sites of the RAN 102 generate alarms, alarm notification flow down to the OSSs 104. The network 106 comprises one or more public networks, one or more private networks, or a combination thereof.

The cell site maintenance tracking tool 108 manages cell site maintenance and alarm suppression used by field operations personnel to place the cells site and/or NEs into scheduled maintenance. In some cases, during scheduled maintenance, alarm notifications may be suppressed to avoid unnecessarily opening incident reports related to such alarms. In some cases, a maintenance action may extend beyond the scheduled maintenance window, pending alarms are no longer suppressed (because the scheduled maintenance window has closed), and incident reports may be generated based on the alarms.

The alarm configuration tool 110 allows users to define rules and instructions for handling alarms, for example rules for automatic processing of alarms by the incident management application 114. Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. The incident reporting tool 118 can monitor the alarms stored in the data store 120 and automatically generate incident reports on these alarms based in part on the alarm configurations created and maintained by the alarms configuration tool 110. Incident reports may be referred to in some contexts or by other communication service providers as tickets or trouble tickets.

In an embodiment, the incident management application 114 may perform automatic actions on the generated incident reports including auto-triage, auto-closure, and/or auto-remediation. The auto-triage involves auto-enrichment (adding supplemental information related to the context of the alarm of the NE or cell site equipment), auto-dispatch of field operations personnel (only under certain conditions), and auto-testing.

In an embodiment, the incident management application 114 may import incident reports from the data store 120 into the NOC dashboard 116 (or a graphical user interface (GUI) screen)) after the incident report is automatically closed. In an embodiment, the incident management application 114 identifies one or more alarms associated with the incident report in the GUI. The incident management application 114 may further analyze the one or more alarms and/or the incident reports based on cell site status data and performance data to measure an impact of the incident and to retrieve incident data.

The NOC personnel collect vast amounts of data from a number of sources. NOC personnel use big data analysis to process the data and to extract the information such as cell site status data and performance data to measure the impact of the incident. For example, NOC personnel use big data analysis of data stored on cell site traffic that allows NOC personnel to identify, for each cell site, a loading of traffic on the cell site.

In an embodiment, the incident data comprises information about a description of the incident report, a date of the incident report, a first-occurrence time of the incident report, a last-occurrence time of the incident report, what alarms were impacted by the incident, a type of each alarm associated with the incident report, a first-occurrence time of each alarm, an alarm description, a last-occurrence time of each alarm, duration of the alarm during which an alarm event has been applicable, a number of alarm events generated by a network element, and/or a frequency of alarm events generated by the network element. In an embodiment, the incident data comprises information about a severity level of the alarms/incident report, classification of the alarms based on which network component type an alarm is associated with, and/or what services and technologies were impacted with the incident. In an embodiment, the incident data comprises information about how many customers were impacted by the incident, type of customers impacted by the incident, how long the customers were impacted, which customers were impacted after or before the incident, and/or any other information related to the incident. In one embodiment, the incident data comprises information about customer usage statistics of each technology that was impacted during the incident.

In an embodiment, the analysis of the one or more alarms comprises measuring changes in key performance indicators (KPIs) values and changes in current KPI values from predictable KPI values associated with the incident to evaluate the change in network performance associated with the reported alarms and to measure the impact accordingly. Based on KPIs, cell site status data, performance data, or other indications, analyzing actual prospect of service impacting or service affecting alarms, identifying a severity level of the alarm, fine tuning time delays for autogenerating alarms and incident reports, and reducing false alarms increase troubleshooting efficiency, network reliability, and customer satisfaction with the network.

In an embodiment, the analysis of the one or more alarms comprises determining a probable root cause for the incident. In an embodiment, the analysis of the one or more alarms comprises determining corrective/remedial actions taken or to be taken automatically or manually by an operator to successfully resolve the incident. For example, cell sites can be reset to restore operation, clear alarmed conditions, and to resolve an incident. For example, cell sites can be locked and unlocked to restore operation, clear alarmed conditions, and to resolve incidents.

In an embodiment, the incident management application 114 collects the analyzed incident information from a plurality of disparate data sources and attach this relevant supplement information to the incident report to continue documenting recommended corrective actions learned to help address similar issues in the future.

In an embodiment, the automated triage process can assign the incident report with supplement incident information to NOC personnel for handling. The NOC personnel use the NOC dashboard 116 to monitor health of a carrier network (e.g., monitor the RAN 102 and at least portions of the network 106), to monitor alarms, to review incident reports, and to review implementation of each recommended corrective action to prioritize actions to be taken automatically or by NOC personnel in the future to resolve the issue within the shortest possible time. This prioritization can be determined based on various factors such as how severe is the incident report or alarm, and/or how effective the recommended corrective action is in resolving the particular issue.

In a first case, as mentioned, actions for the alarms may be prioritized based on severity score of the alarms. The severity score is determined based on impact of the incident on the customers (i.e. number of customers impacted by a service outage) or on a communication service provider. The alarm severity scores may be utilized for prioritizing and/or optimizing action orders for the alarms. The actions may be corrective actions commanded or assigned to be completed to restore the network node to an unalarmed state.

In a second case, actions for the alarms may be prioritized based on an effectiveness value of the one or more recommended corrective actions. In one embodiment, the effectiveness value of the recommended corrective actions provides a measure (e.g., a percentage value) of an effectiveness of the one or more recommended corrective actions in resolving the historical incidents. Based on the effectiveness value, the NOC personnel scores a priority of the one or more recommended corrective actions to prioritize predicted incidents to help address similar issues in a network for optimizing or improving the operability of the network. For example, if a first recommended corrective action for a first incident is 95% effective in like scenarios and a second recommended corrective action for a second incident is 33% effective in like scenarios, NOC personnel will prioritize to fix the first incident whose recommended corrective action is 95% effective before the second incident whose recommended corrective action is 33% effective. This helps to inform future decisions on prioritizing future incidents based on effectiveness of the recommended corrective actions and what steps automation or NOC personnel should take in the future to resolve the issue within the shortest possible time. Systematically tracking the network and customer impact that occurred during the lifetime of the incident to predict what alarms and automation steps should be taken in the future reduce mean time to repair the issues. In one embodiment, a machine learning model may be trained to classify, filter out, and order the most important alarms, in real time and present those selected alarms to the operators that can help the operators to become more active in addressing network incidents.

Figure 2:
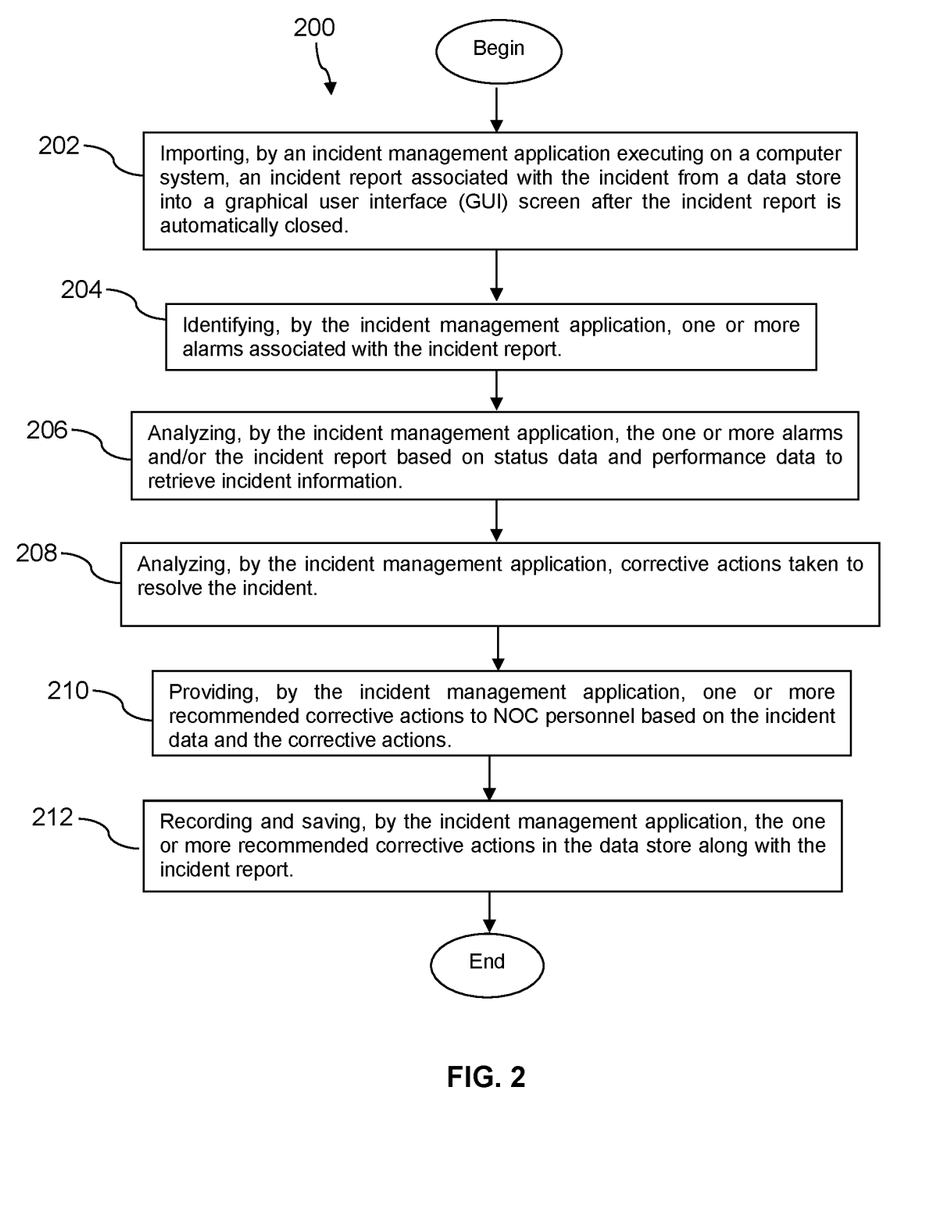
FIG. 2 is a flow chart of a method according to an embodiment of the disclosure.

Turning now to FIG. 2, a method 200 is described. In an embodiment, the method 200 is a method of measuring an impact of an incident in a telecommunication network management system. At block 202, the method 200 comprises importing, by an incident management application executing on a computer system, an incident report associated with the incident from a data store into a graphical user interface (GUI) screen after the incident report is automatically closed. A GUI screen may be referred to as a NOC dashboard.

At block 204, the method 200 comprises identifying, by the incident management application, one or more alarms associated with the incident report. At block 206, the method 200 comprises analyzing, by the incident management application, the one or more alarms and/or the incident report based on site status data and performance data to retrieve incident data. At block 208, the method 200 comprises analyzing, by the incident management application, corrective actions taken to successfully resolve the incident. In an embodiment, the incident data comprises information about a type of the one or more alarms, a first-occurrence time of the one or more alarms, a description of the one or more alarms, a last-occurrence time of the one or more alarms, duration of the alarm during which an alarm event has been applicable, a number of alarm events generated by a network element, a frequency of alarm events generated by the network element, a severity level of each alarm, a classification of the alarms based on which network component type an alarm is associated with, what services were impacted by the incident, what technologies were impacted by the incident, root cause indicators of the incident, how many customers were impacted by the incident, type of customers, how long the customers were impacted, or which customers were impacted after or before the incident, and/or changes in key performance indicators (KPIs).

At block 210, the method 200 comprises, after retrieving the incident data, providing, by the incident management application, recommended corrective actions to NOC personnel based on the incident data and the corrective actions. At block 212, the method 200 comprises recording and saving, by the incident management application, the recommended corrective actions in the data store along with the incident report.

Figure 3:
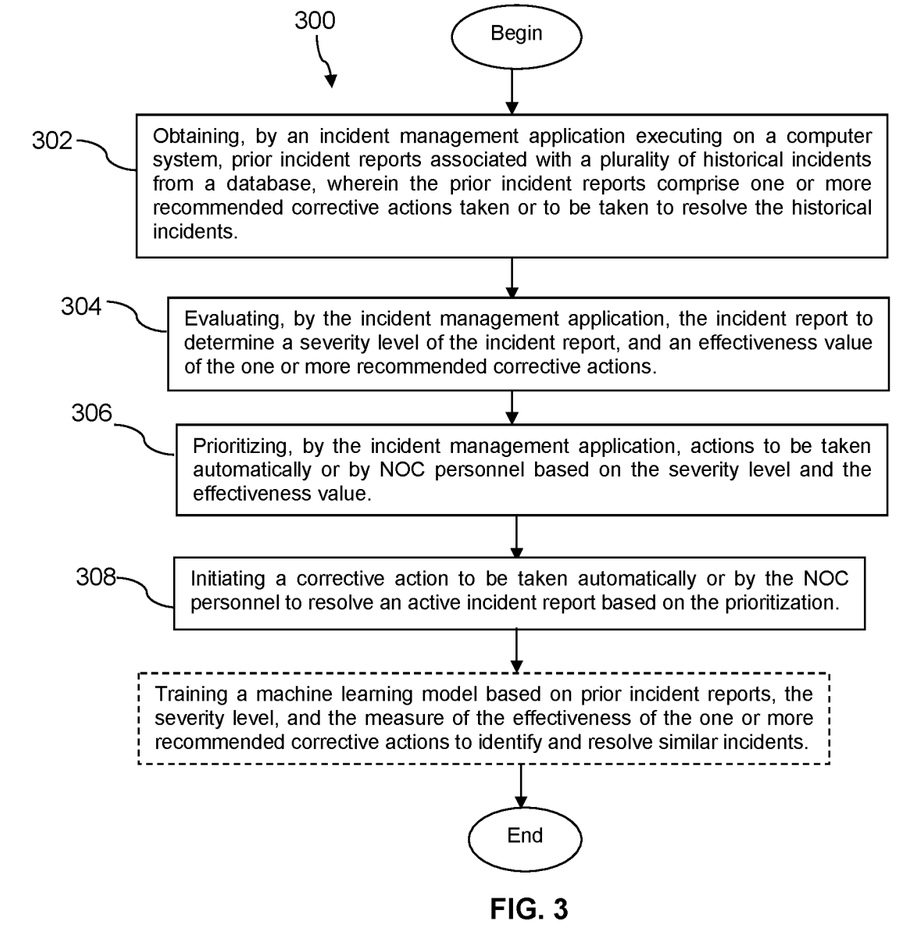
FIG. 3 is a flow chart of another method according to an embodiment of the disclosure.

Turning now to FIG. 3, a method 300 is described. In an embodiment, the method 300 is a method of initiating actions based on analysis of automated fix actions in a telecommunication network management system. At block 302, the method 300 comprises obtaining, by an incident management application executing on a computer system, prior incident reports associated with a plurality of historical incidents from a database, wherein the prior incident reports comprise one or more recommended corrective actions taken or to be taken to resolve the historical incidents.

At block 304, the method 300 comprises evaluating, by the incident management application, the prior incident reports to determine a severity level of the prior incident reports, and an effectiveness value of the one or more recommended corrective actions. At block 306, the method 300 comprises prioritizing actions to be taken automatically or by NOC personnel based on the severity level and the effectiveness value. At block 308, the method 300 may further comprises training a machine learning model based on prior incident reports, the severity level, and the measure of the effectiveness of the one or more recommended corrective actions to identify and resolve similar incidents.

Figure 4:
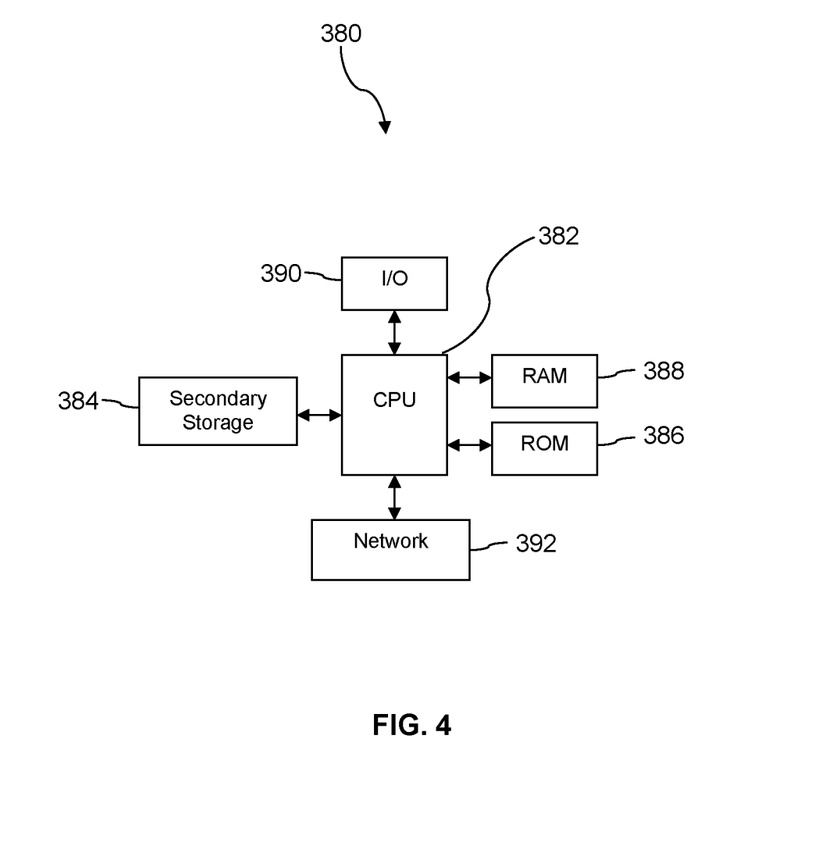
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and another computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of initiating actions based on analysis of automated fix actions in a telecommunication network management system, the method comprising:
    obtaining, by an incident management application executing on a computer system, prior incident reports associated with a plurality of historical incidents from a database, wherein the prior incident reports comprise one or more recommended corrective actions taken or to be taken to resolve the historical incidents;
    evaluating, by the incident management application, the prior incident reports to determine at least one of a severity level of the prior incident reports or an effectiveness value of the one or more recommended corrective actions;
    prioritizing, by the incident management application, actions to be taken automatically or by NOC personnel based on the severity level and/or the effectiveness value;
    training, by the incident management application, a machine learning model to predict a root cause and resolution of similar incidents based on the prior incident reports, the severity level, the effectiveness value of the one or more recommended corrective actions, and the prioritized actions to be taken automatically or by NOC personnel;
    receiving, by the incident management application, an active incident report describing an active incident at a cell site;
    analyzing, by the incident management application, the active incident report by measuring changes in key performance indicators (KPIs) at the cell site to evaluate a current network performance and service impact at the cell site;
    determining, by the incident management application using the trained machine learning model, a corrective action to be taken automatically or by the NOC personnel that is most likely to resolve the active incident report based on the prioritization and historical corrective actions previously performed at the cell site for prior incidents with similar changes in the KPIs at the cell site, wherein the corrective action determined for the current network performance and the service impact at the cell site comprises resetting the cell site to resolve the active incident at the cell site and restore operation at the cell site; and
    resetting, by the incident management application, the cell site to resolve the active incident at the cell site and restore operation at the cell site.

2. The method of claim 1, wherein the effectiveness value provides a measure of an effectiveness of the one or more recommended corrective actions in resolving the historical incidents.

3. The method of claim 1, further comprising training, by the incident management application, the machine learning model to review current incident data based on the active incident report and historical incident data based on the prior incident reports to determine the corrective action to be taken to resolve the active incident.

4. A method of initiating actions based on analysis of an impact of an incident in a telecommunication network management system, comprising:
    importing, by an incident management application executing on a computer system, a prior incident report associated with a prior incident from a data store into a graphical user interface (GUI) screen after the prior incident report is automatically closed;
    identifying, by the incident management application, one or more alarms associated with the prior incident report;
    analyzing, by the incident management application, at least one of the one or more alarms or the prior incident report based on site status data and performance data to retrieve incident data;
    analyzing, by the incident management application, prior corrective actions taken to resolve the prior incident;
    providing, by the incident management application, one or more recommended corrective actions to NOC personnel based on the incident data and the prior corrective actions taken to resolve the prior incident;
    recording and saving, by the incident management application, the one or more recommended corrective actions in the data store along with the prior incident report;
    evaluating, by the incident management application, the prior incident report to determine a severity level of the prior incident report, and an effectiveness value of the one or more recommended corrective actions;
    prioritizing, by the incident management application, actions to be taken by the NOC personnel based on the severity level and the effectiveness value;
    training, by the incident management application, a machine learning model to predict a root cause and resolution of similar incidents based on the prior incident report, the severity level, the effectiveness value of the one or more recommended corrective actions, and the prioritized actions to be taken automatically or by NOC personnel;
    receiving, by the incident management application, an active incident report describing an active incident at a cell site;
    analyzing, by the incident management application, the active incident report by measuring changes in key performance indicators (KPIs) at the cell site to evaluate a current network performance and service impact at the cell site;

determining, by the incident management application using the trained machine learning model, a corrective action to be taken automatically or by the NOC personnel that is most likely to resolve the active incident report based on the prioritization and historical corrective actions previously performed at the cell site for prior incidents with similar changes in the KPIs at the cell site, wherein the corrective action determined for the current network performance and the service impact at the cell site comprises locking and subsequently unlocking the cell site to resolve the active incident at the cell site and restore operation at the cell site; and locking and subsequently unlocking, by the incident management application, the cell site to resolve the active incident at the cell site and restore operation at the cell site.

5. The method of claim 4, wherein the incident data comprises information about a description of the prior incident report, a date of the prior incident report, a first-occurrence time of the prior incident report, a last-occurrence time of the prior incident report, a description of the one or more alarms associated with the prior incident report, a context of the one or more alarms, duration of the alarm during which an alarm event has been applicable, a number of alarm events generated by a network element, and/or a frequency of alarm events generated by the network element.

6. The method of claim 4, wherein the incident data comprises a severity level of the prior incident report.

7. The method of claim 4, wherein the incident data comprises a classification of the alarms based on which network component type an alarm is associated with.

8. The method of claim 4, wherein the incident data comprises what services and/or technologies were impacted by the prior incident.

9. The method of claim 4, wherein the incident data comprises root cause indicators of the prior incident.

10. The method of claim 4, wherein the incident data comprises how many customers were impacted by the prior incident, which type of customers were impacted by the prior incident, how long the customers were impacted, or which customers were impacted after or before the prior incident.

11. The method of claim 4, further comprising training, by the incident management application, the machine learning model to review current incident data based on the active incident report and historical incident data based on the prior incident reports to determine the corrective action to be taken to resolve the active incident.

12. A method of measuring an impact of an incident in a telecommunication network management system, the method comprising:

importing, by an incident management application executing on a computer system, a prior incident report associated with a prior incident from a data store into a graphical user interface (GUI) screen after the prior incident report is automatically closed;

identifying, by the incident management application, one or more alarms associated with the prior incident report;

analyzing, by the incident management application, at least one of the one or more alarms or the prior incident report based on site status data and performance data to retrieve incident data;

analyzing, by the incident management application, prior corrective actions taken to resolve the prior incident;

providing, by the incident management application using a trained machine learning model, one or more recommended corrective actions to NOC personnel based on the incident data and the prior corrective actions taken to resolve the prior incident, wherein the trained machine learning model is trained to predict a root cause and resolution of incidents similar to the prior incident based on prior incident report, a severity level of the prior incident report, and an effectiveness value of the one or more recommended corrective actions;

recording and saving, by the incident management application, the recommended corrective actions in the data store along with the prior incident report;

receiving, by the incident management application, an active incident report describing an active incident at a cell site;

analyzing, by the incident management application, the active incident report by measuring changes in key performance indicators (KPIs) at the cell site to evaluate a current network performance and service impact at the cell site;

determining, by the incident management application using the trained machine learning model, a corrective action to be taken automatically or by the NOC personnel that is most likely to resolve the active incident report based on the prioritization and historical corrective actions previously performed at the cell site for prior incidents with similar changes in the KPIs at the cell site, wherein the corrective action determined for the current network performance and the service impact at the cell site comprises resetting the cell site to resolve the active incident at the cell site and restore operation at the cell site; and resetting, by the incident management application, the cell site to resolve the active incident at the cell site and restore operation at the cell site.

13. The method of claim 12, wherein the incident data comprises information about a description of the prior incident report, a date of the prior incident report, a first-occurrence time of the prior incident report, a last-occurrence time of the prior incident report, a description of the one or more alarms associated with the prior incident report, a context of the one or more alarms, duration of the alarm during which an alarm event has been applicable, a number of alarm events generated by a network element, and/or a frequency of alarm events generated by the network element.

14. The method of claim 12, wherein the incident data comprises a severity level of the prior incident report.

15. The method of claim 12, wherein the incident data comprises a classification of the alarms based on which network component type an alarm is associated with.

16. The method of claim 12, wherein the incident data comprises what services were impacted by the prior incident.

17. The method of claim 12, wherein the incident data comprises what technologies were impacted by the prior incident.

18. The method of claim 12, wherein the incident data comprises root cause indicators of the prior incident.

19. The method of claim 12, wherein the incident data comprises how many customers were impacted by the prior incident, which type of customers were impacted by the prior incident, how long the customers were impacted, or which customers were impacted after or before the prior incident.

20. The method of claim 12, wherein analyzing the prior incident report comprises measuring changes in key performance indicators (KPIs).

* * * * *